United States Patent
Gao et al.

(10) Patent No.: US 12,367,019 B2
(45) Date of Patent: Jul. 22, 2025

(54) METHOD AND APPARATUS FOR IMPLEMENTING BATCH SYSTEM CALL

(71) Applicant: HUAWEI TECHNOLOGIES CO., LTD., Guangdong (CN)

(72) Inventors: Xin Gao, Shenzhen (CN); Yuzhong Wen, Hangzhou (CN); Bin Fang, Shanghai (CN); Hai He, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 166 days.

(21) Appl. No.: 18/365,312

(22) Filed: Aug. 4, 2023

(65) Prior Publication Data

US 2023/0376289 A1 Nov. 23, 2023

Related U.S. Application Data

(63) Continuation of application No. PCT/CN2022/071747, filed on Jan. 13, 2022.

(30) Foreign Application Priority Data

Feb. 5, 2021 (CN) .......................... 202110163179.2

(51) Int. Cl.
*G06F 8/41* (2018.01)
(52) U.S. Cl.
CPC ...................................... *G06F 8/42* (2013.01)
(58) Field of Classification Search
CPC ........................................................ G06F 8/42
See application file for complete search history.

(56) References Cited

U.S. PATENT DOCUMENTS 5,584,023 A * 12/1996 Hsu ..................... G06F 21/6218
717/136
7,191,445 B2 3/2007 Brokish
(Continued)

FOREIGN PATENT DOCUMENTS

CN 105468400 A 4/2016
CN 105677493 A 6/2016
(Continued)

OTHER PUBLICATIONS

International Search Report and Written Opinion issued in PCT/CN2022/071747, dated Apr. 13, 2022, 10 pages.

*Primary Examiner* — Phillip H Nguyen

(57) ABSTRACT

A method and a related apparatus for implementing a batch system call are disclosed. The method includes: loading an executable program to a user-mode virtual address space, where the executable program is obtained by compiling source code of the batch system call, and includes abstract syntax tree (AST) data of the batch system call; and invoking a first instruction to invoke a kernel to generate, based on the AST data in the user-mode virtual address space, binary code that is used to implement the batch system call. Because there is difficulty in inserting malicious data into a data structure like the AST, it is difficult to insert malicious code into the binary code of the batch system call, so as to avoid an error or an excessively long delay caused by the malicious code when the kernel runs the binary code of the batch system call, thereby improving security of the batch system call.

17 Claims, 9 Drawing Sheets

(56) References Cited

U.S. PATENT DOCUMENTS

2016/0147559 A1\* 5/2016 Weimer .................... G06F 8/76
                                                        712/228
2018/0349614 A1\* 12/2018 Ionescu ................. G06F 21/577
2019/0108342 A1\* 4/2019 Conikee ................ G06F 21/577

FOREIGN PATENT DOCUMENTS

| CN | 107729159 A |   | 2/2018 |            |
|----|-------------|---|--------|------------|
| CN | 108062253 A |   | 5/2018 |            |
| CN | 112199217 A |   | 1/2021 |            |
| CN | 114546539 A | \* | 5/2022 | ............. G06F 8/315 |
| WO | 2017036376 A1 |   | 3/2017 |          |

\* cited by examiner

METHOD AND APPARATUS FOR IMPLEMENTING BATCH SYSTEM CALL

CROSS-REFERENCE TO RELATED APPLICATIONS

This application is a continuation of International Application No. PCT/CN 2022/071747, filed on Jan. 13, 2022, which claims priority to Chinese Patent Application No. 202110163179.2, filed on Feb. 5, 2021. The disclosures of the aforementioned applications are hereby incorporated by reference in their entireties.

TECHNICAL FIELD

Embodiments of this disclosure relate to the field of operating system technologies, and in particular, to a method and an apparatus for implementing a batch system call.

BACKGROUND

Microkernel is a kernel architecture widely used currently in the field of real-time operating systems. The microkernel features low complexity, high security, and real-time performance.

In a microkernel architecture, similar to an application, a system program also runs in a user mode. Therefore, the application running in the user mode needs to invoke, through inter-process communication (IPC), the system program running in the user mode. In a running process, the application usually invokes, for a plurality of times, the system program running in the user mode, and the plurality of system program calls cause frequent context switching, resulting in performance deterioration of an operating system.

Currently, a main solution is to package a plurality of system calls into a batch system call, and implement the plurality of system calls at a time through the batch system call, thereby reducing a number of IPCs and improving the performance of the operating system.

To implement the batch system call, in the solution, binary code for implementing the batch system call is first registered with the kernel. When the batch system call needs to be performed, the kernel executes the binary code.

Malicious code is prone to be inserted into the binary code, and consequently, the security is poor.

SUMMARY

Embodiments of this disclosure provide a method and a related apparatus for implementing a batch system call. The method can improve security of the batch system call.

A first aspect of the embodiments of this disclosure provides a method for implementing a batch system call, including: A compiler compiles source code of a batch system call into an executable program, where the source code may be C source code or domain-specific language (DSL) source code, the executable program includes abstract syntax tree (AST) data of the batch system call, and the AST is an abstract representation of a syntax structure of the source code. A loader loads the executable program to a user-mode virtual address space, where the executable program is obtained by compiling the source code of the batch system call and includes the abstract syntax tree (AST) data of the batch system call. The loader invokes a first instruction, where the first instruction is used to invoke a kernel to read the AST data from the user-mode virtual address space, and generate, based on the AST data, binary code that is stored in a kernel-mode virtual address space and that is used to implement the batch system call. In this way, during the batch system call, the kernel may execute the binary code to implement the batch system call.

Because there is difficulty in inserting malicious data into a data structure like the AST is challenging, it is difficult to insert malicious code into the binary code of the batch system call that is generated based on the AST data of the batch system call, so as to avoid an error or an excessively long delay caused by the malicious code when the kernel runs the binary code of the batch system call, thereby improving security of the batch system call.

In an implementation, the executable program further includes call stub code of the batch system call, where the call stub code may be understood as code that replaces the binary code of the batch system call. Based on this, the method further includes: invoking a second instruction in the call stub code, where the second instruction is used to invoke the kernel to execute the binary code that is used to implement the batch system call.

In this implementation, the batch system call is implemented through the call stub code.

In an implementation, after the invoking of a first instruction, the method further includes: receiving an invoking result of the first instruction, where the invoking result includes an identifier of the binary code of the batch system call. The identifier can indicate the binary code of the batch system call, and therefore the identifier is used as a parameter of the second instruction. That is, the second instruction carries the identifier and is used to invoke the kernel to execute the binary code that corresponds to the identifier and that is used to implement the batch system call.

Adding the identifier of the binary code that is used to implement the batch system call to the second instruction enables the kernel to find the binary code that is used to implement the batch system call based on the identifier, so as to complete the batch system call.

In an implementation, the source code of the batch system call includes delay information of the batch system call, the AST data includes the delay information of the batch system call, and the delay information of the system call is usually implicit in the AST data. The first instruction is further used to invoke the kernel to calculate a worst-case execution time of the batch system call based on the delay information in the AST data.

Compared with the binary code, the AST data may well retain the delay information, and the kernel may be invoked, through the first instruction, to calculate the worst-case execution time of the batch system call based on the delay information in the AST data, so as to ensure that the batch system call has a deterministic delay.

In an implementation, the first instruction is further used to invoke the kernel to store the worst-case execution time into the kernel-mode virtual address space.

The kernel is invoked through the first instruction, so that the kernel stores the worst-case execution time into the kernel-mode virtual address space. In this way, the worst-case execution time can be read during the batch system call, so as to obtain the deterministic delay.

A second aspect of the embodiments of this disclosure provides a method for implementing a batch system call, including: A kernel reads, in response to a first instruction, abstract syntax tree (AST) data of the batch system call from a user-mode virtual address space, where the AST is an abstract representation of a syntax structure of source code. The kernel generates, based on the AST data, binary code that is used to implement the batch system call. The kernel stores the generated binary code into a kernel-mode virtual address space. In this way, during the batch system call, the kernel may execute the binary code to implement the batch system call.

Because there is difficulty in inserting malicious data into a data structure like the AST is challenging, it is difficult to insert malicious code into the binary code of the batch system call that is generated based on the AST data of the batch system call, so as to avoid an error or an excessively long delay caused by the malicious code when the kernel runs the binary code of the batch system call, thereby improving security of the batch system call.

In an implementation, the method further includes: The kernel executes, in response to a second instruction, the binary code that is used to implement the batch system call.

The kernel executes the binary code that is used to implement the batch system call, thereby implementing the batch system call.

In an implementation, the second instruction carries an identifier of the binary code that is used to implement the batch system call, and the identifier enables the kernel to find the current binary code of the batch system call from a plurality of pieces of binary code of the batch system call. That the kernel executes, in response to a second instruction, the binary code that is used to implement the batch system call includes: The kernel executes, in response to the second instruction, the binary code that corresponds to the identifier and that is used to implement the batch system call.

Because the second instruction carries the identifier of the binary code of the batch system call, the kernel may find the binary code of the batch system call based on the identifier, so as to complete the batch system call.

In an implementation, the AST data includes delay information of the batch system call. The method further includes: The kernel calculates a worst-case execution time of the batch system call based on the delay information in the AST data.

Compared with the binary code, the AST data may well retain the delay information. Based on the delay information of the batch system call included in the AST data, the kernel can calculate the worst-case execution time of the batch system call, so as to ensure that the batch system call has a deterministic delay.

In an implementation, the method further includes: The kernel stores the worst-case execution time into the kernel-mode virtual address space.

The worst-case execution time is stored in the kernel-mode virtual address space, so that the worst-case execution time can be read during the batch system call, so as to obtain the deterministic delay.

A third aspect of the embodiments of this disclosure provides an apparatus for implementing a batch system call, including: a compilation unit, configured to compile source code of the batch system call into an executable program, where the executable program includes abstract syntax tree (AST) data of the batch system call; a loading unit, configured to load the executable program to a user-mode virtual address space, where the executable program is obtained by compiling the source code of the batch system call and includes the abstract syntax tree (AST) data of the batch system call; and an invoking unit, configured to invoke a first instruction, where the first instruction is used to invoke a kernel to read the AST data from the user-mode virtual address space, and generate, based on the AST data, binary code that is stored in a kernel-mode virtual address space and that is used to implement the batch system call.

In an implementation, the executable program further includes call stub code of the batch system call, and the invoking unit is further configured to invoke a second instruction when the call stub code of the batch system call is executed, where the second instruction is used to invoke the kernel to execute the binary code that is used to implement the batch system call.

In an implementation, the invoking unit is further configured to receive an invoking result of the first instruction, where the invoking result includes an identifier of the binary code that is used to implement the batch system call. The second instruction carries the identifier, and is used to invoke the kernel to execute the binary code that corresponds to the identifier and that is used to implement the batch system call.

In an implementation, the source code of the batch system call includes delay information of the batch system call, and the AST data includes the delay information of the batch system call. The first instruction is further used to invoke the kernel to calculate a worst-case execution time of the batch system call based on the delay information in the AST data.

In an implementation, the first instruction is further used to invoke the kernel to store the worst-case execution time into the kernel-mode virtual address space.

For specific implementations, related descriptions, and technical effects of the foregoing units, refer to descriptions in the first aspect of embodiments of this disclosure.

A fourth aspect of the embodiments of this disclosure provides an apparatus for implementing a batch system call, including: a reading unit, configured to read, in response to a first instruction, abstract syntax tree (AST) data of the batch system call from a user-mode virtual address space; and a registration unit, configured to generate, based on the AST data, binary code that is used to implement the batch system call; and the registration unit is further configured to store the generated binary code into a kernel-mode virtual address space.

In an implementation, the registration unit is further configured to execute, in response to a second instruction, the binary code that is used to implement the batch system call.

In an implementation, the second instruction carries an identifier of the binary code that is used to implement the batch system call. The registration unit is further configured to execute, in response to the second instruction, the binary code that corresponds to the identifier and that is used to implement the batch system call.

In an implementation, the AST data includes delay information of the batch system call. The registration unit is further configured to calculate a worst-case execution time of the batch system call based on the delay information in the AST data.

In an implementation, the registration unit is further configured to store the worst-case execution time into the kernel-mode virtual address space.

For specific implementations, related descriptions, and technical effects of the foregoing units, refer to descriptions in the second aspect of embodiments of this disclosure.

A fifth aspect of the embodiments of this disclosure provides a computer device, including one or more processors and a memory, where the memory stores computer-readable instructions, and the one or more processors read the computer-readable instructions, so that the computer device implements the method according to any one of the implementations of the first aspect. The computer device may be a terminal device, for example, a smartphone, a smart speaker, a large-screen device, a tablet computer, an in-vehicle intelligent apparatus, an artificial intelligence device, or a virtual reality/augmented reality/hybrid reality device.

A sixth aspect of the embodiments of this disclosure provides a terminal device, including one or more processors and a memory, where the memory stores computer-readable instructions, and the one or more processors read the computer-readable instructions, so that the computer device implements the method according to any one of the implementations of the second aspect.

A seventh aspect of the embodiments of this disclosure provides a computer-readable storage medium, including computer-readable instructions. When the computer-readable instructions are run on a computer, the computer is enabled to perform the method according to any one of the implementations of the first aspect or the second aspect.

An eighth aspect of the embodiments of this disclosure provides a chip, including one or more processors. A part or all of the processors are configured to read and execute computer programs stored in a memory, to perform the method according to any one of the possible implementations of the first aspect or the second aspect.

Optionally, the chip includes the memory, and the memory and the processor are connected to the memory by using a circuit or a wire. Further, optionally, the chip further includes a communication interface, and the processor is connected to the communication interface. The communication interface is configured to receive data or information or both that need to be processed. The processor obtains the data and/or the information from the communication interface, processes the data and/or the information, and outputs a processing result through the communication interface. The communication interface may be an input/output interface.

In some implementations, some of the one or more processors may implement some steps in the foregoing method by using dedicated hardware. For example, processing related to a neural network model may be implemented by a dedicated neural network processor or graphics processing unit.

The method provided in embodiments of this disclosure may be implemented by one chip, or may be cooperatively implemented by a plurality of chips.

A ninth aspect of the embodiments of this disclosure provides a computer program product. The computer program product includes computer software instructions, and the computer software instructions may be executed by one or more processors to implement the method according to any one of the implementations of the first aspect or the second aspect.

A tenth aspect of the embodiments of this disclosure provides a compilation method. The method may be completed offline, for example, completed before delivery of a computer device (for example, a smartphone). The compilation method includes: compiling source code of a batch system call into an executable program, where the executable program includes abstract syntax tree (AST) data of the batch system call. The AST data is then used to generate binary code that is stored in a kernel-mode virtual address space and that is used to implement the batch system call.

Because the source code of the batch system call is compiled into the executable program, the executable program includes the abstract syntax tree (AST) data of the batch system call, and inserting malicious data into a data structure like the AST is challenging, it is difficult to insert malicious code into the binary code of the batch system call that is generated based on the executable program, thereby improving security of the batch system call.

Correspondingly, an eleventh aspect of the embodiments of this disclosure provides a compilation apparatus, including:

a compilation unit, configured to compile source code of a batch system call into an executable program, where the executable program includes abstract syntax tree (AST) data of the batch system call, and is used to generate binary code that is stored in a kernel-mode virtual address space and that is used to implement the batch system call.

A twelfth aspect and a thirteenth aspect of the embodiments of this disclosure respectively provide a run-time compilation method and a run-time compiler. The compilation method includes: compiling abstract syntax tree (AST) data in an executable program to generate binary code that is stored in a kernel-mode virtual address space and that is used to implement a batch system call, where the executable program is obtained by compiling source code of the batch system call. Correspondingly, the run-time compiler includes a compilation unit, configured to compile abstract syntax tree (AST) data in the executable program to generate the binary code that is stored in the kernel-mode virtual address space and that is used to implement the batch system call.

It can be learned from the foregoing technical solutions that the embodiments of this disclosure at least have the following advantages:

In the user mode, the source code of the batch system call is compiled into the AST data of the batch system call, and then the AST data is loaded to a user-mode virtual address space. A kernel reads the AST data from the user-mode virtual address space, generates, based on the AST data, the binary code of the batch system call, and finally stores the binary code of the batch system call into the kernel-mode virtual address space, so as to complete registration of the batch system call. Because there is difficulty in inserting malicious data into a data structure like the AST is challenging, it is difficult to insert malicious code into the binary code that is generated based on the AST data of the batch system call and that is used to implement the batch system call, so as to avoid an error or an excessively long delay that occurs when the kernel runs the binary code that is used to implement the batch system call due to the malicious code, thereby improving security of the batch system call.

DESCRIPTION OF EMBODIMENTS

An operating system is system software that manages computer hardware and software resources, and is also a cornerstone of a computer system. The operating system needs to handle basic transactions, for example, manage and configure a memory, determine a priority of a system resource supply and demand, control input and output devices, operate a network, and manage a file system. The operating system may further provide an operating interface for a user to interact with the system.

Currently, there are at least two operating system architectures: a microkernel architecture and a macrokernel architecture. Embodiments of this disclosure may be applied to the microkernel architecture. The microkernel architecture is characterized by running as few functions as possible in a kernel space and providing necessary mechanisms to implement the operating system. These mechanisms include virtual address space management, thread management, inter-process communication, and the like. Compared with the macrokernel architecture, the microkernel runs many components, such as a file system and a network protocol stack, in a user mode, thereby reducing the kernel functions to a very small extent.

Figure 1:
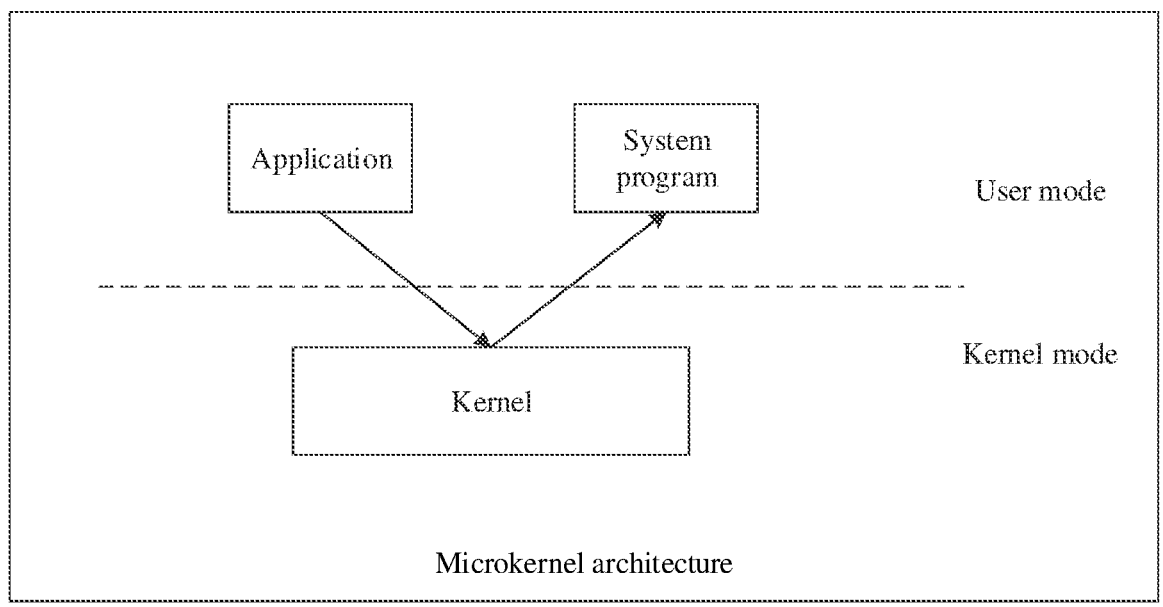
FIG. 1 is a schematic diagram of a microkernel architecture according to an embodiment of this disclosure.

A microkernel architecture applied in this embodiment may be shown in FIG. 1. The microkernel architecture includes a kernel running in a kernel mode, an application running in the user mode, and a system program running in the user mode.

The kernel is a program used to manage data input and output requirements sent by software, translate these requirements into data processing instructions, and send the instructions to a processor and/or another electronic component in a computer for processing, and the kernel is a most basic part of a modern operating system.

A system program is a system that controls and coordinates computer devices and external devices and supports development and running of application software, and the system program is a set of programs that require no user intervention. The system program includes but is not limited to a file system program, a memory management program, a network program, and a driver. The application corresponds to the system program, and is a set of programs that can be used by a user.

The kernel mode and the user mode are two working states of the processor (the following uses a central processing unit (CPU) as an example for description). If the CPU executes a system call to execute kernel code, it is considered that the CPU (or a current process) is in the kernel mode. If the CPU executes user code, it is considered that the CPU (or a current process) is in the user mode. The kernel mode may also be referred to as a privileged mode, and the user mode may also be referred to as a non-privileged mode. The following uses the kernel mode and the user mode for description.

In the user mode, because the application and the system program are isolated from each other, the application cannot directly invoke the system program, but needs to invoke the system program through inter-process communication (IPC). In a running process, the application usually needs to invoke the system program for a plurality of times. However, the plurality of calls of the system program cause frequent context switching, which deteriorates performance of the operating system. Therefore, a plurality of system calls are packaged into a batch system call. In this way, the plurality of system calls can be implemented at a time through the batch system call, thereby reducing the number of IPCs and improving the performance of the operating system.

A context refers to execution information of processes in the operating system. The context switching refers to process switching performed by the kernel on the CPU. For example, in a process of switching from a process A to a process B, the CPU reads execution information of the process A from a register and stores the execution information in a process control block of the process A, where the process control block is located in a memory. Then, the CPU restores execution information of the process B to the register, and executes the process B. It can be learned that, a context switching process involves saving and restoring process execution information. If process switching frequently occurs, the execution information is frequently saved and restored, thereby affecting the performance of the operating system.

A process is a running entity of a program. A program is a description of instructions, data, and organization forms. There may be a plurality of concurrent threads in one process, and all the threads execute different tasks in parallel. A thread can be an actual unit of operation of a process.

To implement a batch system call, before the application runs, binary code that is in the application and that is used to implement the batch system call is first registered with the kernel. When the batch system call is performed, the kernel may execute the binary code to implement the batch system call.

A process of registering the binary code with the kernel includes: first storing the binary code in a user-mode virtual address space, then reading, through the kernel, the binary code from the user-mode virtual address space, and storing the read binary code in a kernel-mode virtual address space.

However, because the binary code is a line of code, malicious code is easily inserted between lines. If the binary code of the batch system call is stored in the user-mode virtual address space for the kernel to read and complete the registration, once the malicious code is inserted into the binary code of the batch system call in the user-mode virtual address space, the malicious code is registered with the kernel. During the batch system call, the malicious code is executed by the kernel, causing an error. Therefore, the security is poor.

For example, if malicious code of an infinite loop is inserted into the binary code of the batch system call in the user-mode virtual address space, when the kernel executes the binary code of the batch system call, the kernel enters an infinite loop, causing an infinite delay of the batch system call.

In view of this, an embodiment of this disclosure provides a method for implementing a batch system call. Different from directly storing the binary code of the batch system call into the user-mode virtual address space, the method is to convert the binary code that is used to implement the batch system call into abstract syntax tree (AST) data, and then store the AST data into the user-mode virtual address space. After reading the AST data from the user-mode virtual address space, the kernel converts the AST data into binary code and completes the registration. Compared with the binary code, inserting malicious data into an AST data structure is challenging. Therefore, it is difficult to insert malicious code into the binary code that is registered with the kernel and that is used to implement the batch system call, and security is relatively high.

Figure 2:
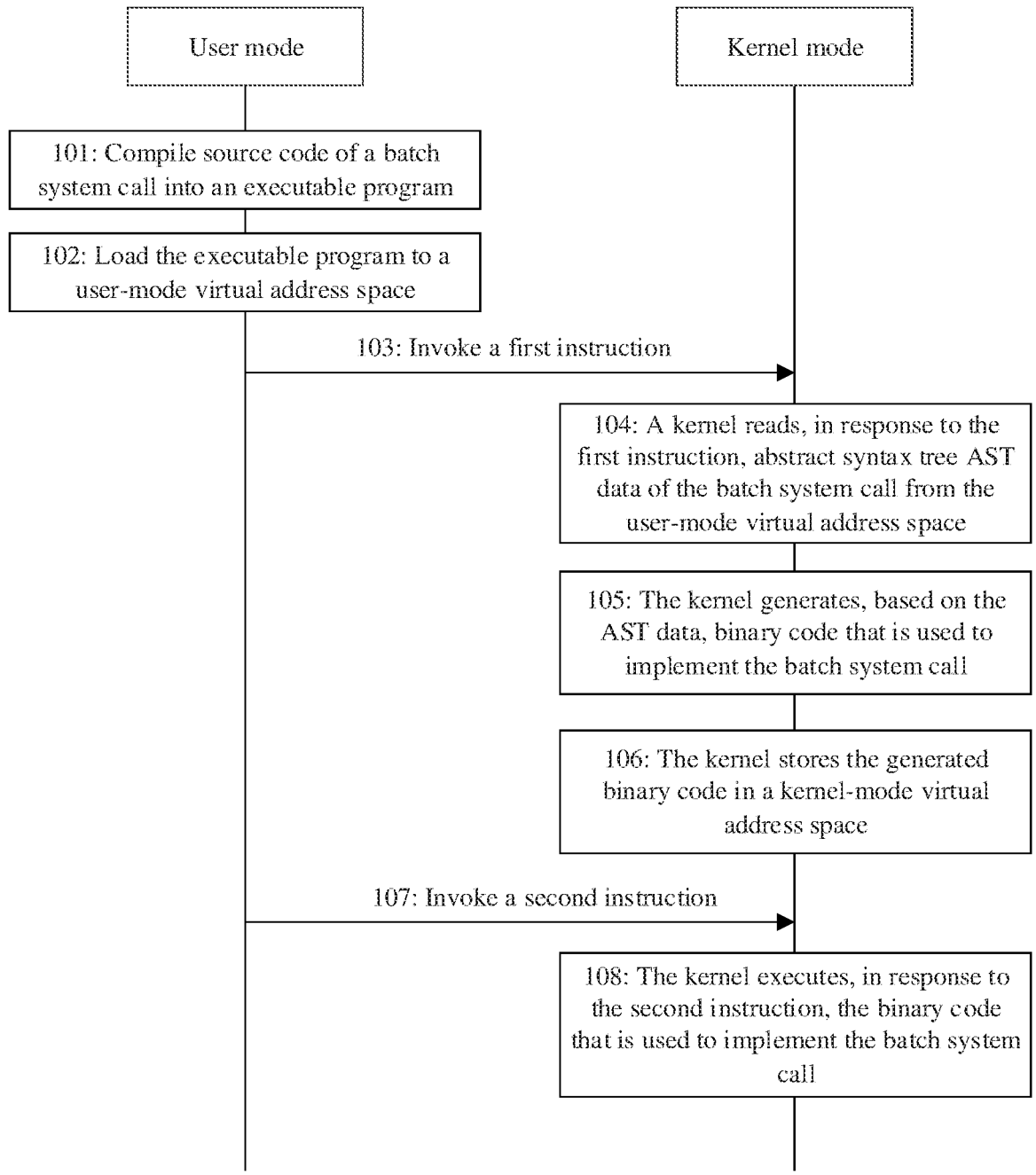
FIG. 2 is a schematic diagram of an embodiment of a method for implementing a batch system call according to an embodiment of this disclosure.

Specifically, FIG. 2 is an embodiment of a method for implementing a batch system call according to an embodiment of this disclosure. The embodiment includes the following operations.

Operation 101: Compile source code of the batch system call into an executable program, where the executable program includes abstract syntax tree (AST) data of the batch system call.

The source code that implements the batch system call can be C source code or domain-specific language (DSL) source code.

The domain-specific language is a computer language specially designed to solve a type of task, and is relative to a general purpose language (GPL).

The executable program usually includes two parts: a program part and a data part. The program part may also be referred to as a program segment, and the data part may also be referred to as a data segment. The data segment is used to store a global variable and a static variable that are of the program.

The abstract syntax tree (AST), also called syntax tree, is an abstract representation of a syntax structure of source code. The abstract syntax tree represents a syntax structure of a programming language in a tree form. Each node in the tree represents a structure in the source code, and the node may be specifically an expression.

The AST data of the batch system call belongs to the data segment in the executable program of the batch system call. Therefore, in this embodiment, the executable program mainly refers to a data segment that includes the AST data. It should be noted that, in a process of compiling the source code of the batch system call, other code may be further generated, and this part of code belongs to the program segment part. For example, in the process of compiling the source code of the batch system call, call stub code of the batch system call may be generated, and the call stub code of the batch system call belongs to the program segment part. The following describes the call stub code of the batch system call in detail.

For ease of understanding the AST data, the following provides a specific example.

Figure 3:
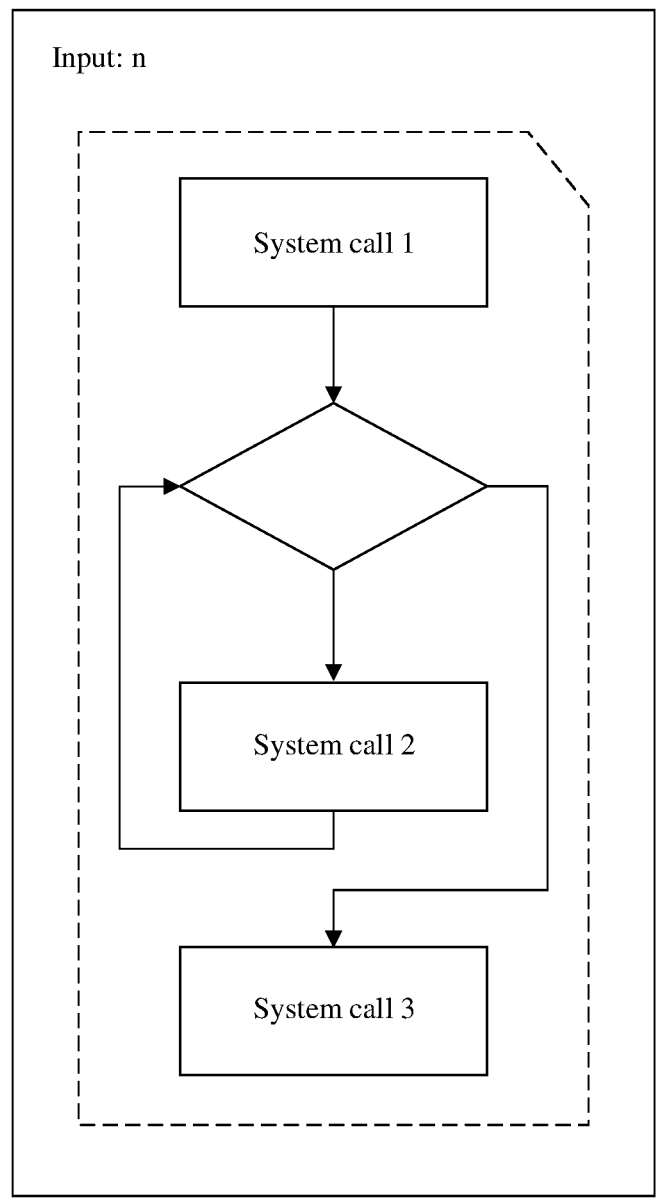
FIG. 3 is a schematic diagram of AST data of a batch system call according to an embodiment of this disclosure.

As shown in FIG. 3, FIG. 3 shows AST data of a batch system call. It can be seen that a data structure of the AST data is different from that of binary code, and there is difficulty in inserting malicious data into a data structure like the AST data.

An executable program may be included in an executable and linkable format (ELF) file, and the executable and linkable format is a binary file format standard of a Unix-like operating system on an x86 architecture. Due to scalability and flexibility, the ELF format may also be applied to an operating system of another processor or computer system architecture.

It should be noted that source code is usually compiled into an executable program by using a compiler, but the compiler usually compiles the source code into binary code. Therefore, a compiler plug-in may be added, and the compiler plug-in is used to compile source code of the batch system call into an executable program that includes the AST data.

Operation 102: Load the executable program to a user-mode virtual address space.

The executable program is obtained by compiling the source code of the batch system call and includes the abstract syntax tree (AST) data of the batch system call.

It may be understood that the executable program is usually stored in an external memory such as a magnetic disk. To run the executable program, it needs to first load the executable program to the user-mode virtual address space.

Virtual address spaces of the operating system include the user-mode virtual address space and a kernel-mode virtual address space. Using a 32-bit Linux operating system as an example, the virtual address space (also referred to as addressing space or linear virtual address space) of the 32-bit Linux operating system is 4 GB. Theoretically, a maximum virtual address space corresponding to each of a kernel, a process of an application, and a process of a system program is 4 GB. However, to ensure kernel security, in the Linux operating system, the upper 1 gigabyte (from a virtual address 0xC0000000 to a virtual address 0xFFFFFFFF) are used by the kernel, and are referred to as kernel-mode virtual address space. The lower 3 gigabytes (from a virtual address 0x00000000 to a virtual address 0xBFFFFFFF) are used by other processes, and are referred to as the user-mode virtual address space.

It can be learned from the foregoing description that the executable program may be included in the ELF file. When the executable program is included in the ELF file, an ELF loader may be used to load the executable program. Specifically, the ELF loader loads the ELF file to the user-mode virtual address space, and then decompresses the ELF file to obtain the executable program.

Operation 103: Invoke a first instruction, where the first instruction is used to invoke a kernel to read the AST data from the user-mode virtual address space, and generate, based on the AST data, binary code of the batch system call that is stored in a kernel-mode virtual address space.

In this embodiment, a system call is invoked by invoking the first instruction. The system call may be understood as a system call for registering the batch system call. The kernel completes registration of the batch system call invoking the system call for registering the batch system call.

Specifically, an address of the user-mode virtual address space may be used as a parameter of the first instruction, and the parameter is transferred to the kernel. Then, the kernel reads the AST data in the user-mode virtual address space based on the parameter, and completes the registration of the batch system call based on the AST data.

It should be noted that the operation of invoking the first instruction may be implemented by a plurality of programs. For example, code of the ELF loader may be modified, so that the ELF loader invokes the first instruction after loading the executable program; or a component may be added, where the component is used to invoke the first instruction after the executable program is loaded.

Operation 104: The kernel reads, in response to the first instruction, the abstract syntax tree (AST) data of the batch system call from the user-mode virtual address space.

Because the kernel may freely access the entire virtual address space (for example, from the virtual address 0xC0000000 to the virtual address 0xFFFFFFFF, and from the virtual address 0x00000000 to the virtual address 0xBFFFFFFF) without any limitation, the kernel may access the user-mode virtual address space.

In this way, after obtaining the parameter of the first instruction, the kernel may read the AST data from the user-mode virtual address space.

Operation 105: The kernel generates, based on the AST data, the binary code that is used to implement the batch system call.

After the AST data is obtained, the kernel may convert the AST data into the binary code. Because a process of generating the binary code based on the AST data is a relatively mature technology, details are not described herein.

Operation 106: The kernel stores the generated binary code into the kernel-mode virtual address space.

The kernel may establish a batch system call table in the virtual address space, and the batch system call table is used to store the binary code of the batch system call.

In this embodiment, in the user mode, the source code of the batch system call is compiled into the AST data of the batch system call, and then the AST data is loaded to the user-mode virtual address space. The kernel reads the AST data from the user-mode virtual address space, generates, based on the AST data, the binary code of the batch system call, and finally stores the binary code of the batch system call into the kernel-mode virtual address space, so as to complete the registration of the batch system call.

Because inserting malicious data into an AST data structure is challenging, it is difficult to insert malicious code into the binary code of the batch system call that is generated based on the AST data of the batch system call, so as to avoid an error or an excessively long delay caused by the malicious code when the kernel runs the binary code of the batch system call, thereby improving security of the batch system call.

It may be understood that, after the binary code of the batch system call is stored into the kernel-mode virtual address space, when the batch system call needs to be performed, the kernel may execute the binary code of the batch system call, so as to complete the batch system call.

The following describes a specific process of the batch system call.

In an implementation, in the process of compiling the source code of the batch system call, in addition to the AST data of the batch system call, the call stub code of the batch system call may also be obtained through compilation. The foregoing executable program further includes the call stub code of the batch system call.

Stub code is code used to replace some code. In this embodiment, the call stub code may be understood as code used to replace the binary code of the batch system call.

Based on this, the method provided in this embodiment may further include the following operation.

Operation 107: Invoke a second instruction when the call stub code of the batch system call is executed, where the second instruction is used to invoke the kernel to execute the binary code that is used to implement the batch system call.

It may be understood that, the call stub code of the batch system call belongs to the program segment of the executable program. In a process of running the executable program, the call stub code of the batch system call is executed, and the second instruction belongs to an instruction in the call stub code.

A process of invoking the second instruction occurs in the user mode, and system calls of the batch system call are implemented by invoking the second instruction.

Correspondingly, the method provided in this embodiment may further include the following operation.

Operation 108: The kernel executes, in response to the second instruction, the binary code that is used to implement the batch system call.

In this embodiment, in the compilation process, the source code of the batch system call is compiled into two parts: the call stub code and the AST data, and the call stub code is used to replace the code of the batch system call. When the call stub code is executed, the kernel is invoked to execute the code of the batch system call, so as to complete the batch system call.

It may be understood that the executable program may include AST data of a plurality of batch system calls. Correspondingly, the kernel stores binary code of the plurality of batch system calls into the kernel-mode virtual address space.

In this case, when one of the plurality of batch system calls needs to be invoked, the kernel needs to first determine which batch system call needs to be invoked. In an implementation, after operation 103, the method provided in this embodiment further includes: receiving an invoking result of the first instruction, where the invoking result includes an identifier of the binary code that is used to implement the batch system call.

In this way, the identifier of the binary code that is used to implement the batch system call may be used as a parameter of the second instruction, or it may be understood that the second instruction carries the identifier of the binary code that is used to implement the batch system call, and the second instruction carrying the identifier is used to invoke the kernel to execute the binary code that corresponds to the identifier and that is used to implement the batch system call.

Based on this, operation 108 includes:

The kernel executes, in response to the second instruction, the binary code that corresponds to the identifier and that is used to implement the batch system call.

The following describes the foregoing process by using a specific example.

For example, the batch system call table in the kernel-mode virtual address space stores binary code of three batch system calls, and identifiers of the binary code of the three batch system calls are respectively a batch system call 0, a batch system call 1, and a batch system call 2. If the identifier of the binary code of the batch system call carried in the second instruction is the batch system call 1, the kernel may search the batch system call table for the binary code of the batch system call 1 and execute the binary code, so as to complete the system call of the batch system call 1.

It should be understood that, compared to a single system call, the batch system call often involves return value dependency and error handling. For example, connection code may be added to the batch system call. The function of the connection code is to determine a next system call and a parameter of the system call based on a return value of a system call. Obviously, complex connection code makes the batch system call not have a deterministic delay.

Deterministic delay: A delay is service execution time, and the deterministic delay means that it needs to be ensured that the service execution time fluctuates within a limited range. For example, if an obstacle in front of an unmanned driving system or an assisted driving system needs to be identified, obstacle identification time needs to be controlled within a fluctuation range. Otherwise, a sensing service cannot be planned, and a control service after the sensing cannot make a mechanical response, for example, perform braking, within determined time. A deterministic delay of the entire system is jointly determined by all components in the system. A deterministic delay of an operating system is a root of the deterministic delay of the entire system. This requires the kernel to respond to a user-mode process within a determined time range.

The following provides a method for ensuring a deterministic delay of the batch system call.

In an implementation, semantics for describing delay information is added to the source code of the batch system call. That is, the source code of the batch system call includes the delay information of the batch system call. Correspondingly, the AST data includes the delay information of the batch system call.

It should be noted that, the delay information of the batch system call is usually implicit in the AST data. For example, a for-each loop is used as an example. The for-each loop traverses elements in an array to obtain a required element. Therefore, a length of the array may be used as delay information. For example, there are 100 elements in the array, and the quantity 100 may be used as the delay information of the for-each cycle. That is, the required element can be obtained by performing traversal a maximum of 100 times.

However, for binary code, delay information cannot be retained. For example, in binary code, code such as go to, br, and beq is usually used to construct a loop. Using the code go to as an example, the code can only indicate to jump to a line of code, but cannot indicate a specific number of jumps.

Therefore, after the semantics for describing the delay information is added to the source code of the batch system call, if the source code of the batch system call is compiled into the binary code of the batch system call, the delay information is lost. However, in this embodiment, the source code of the batch system call is compiled into the AST data of the batch system call, and the delay information is well retained for delay calculation. Based on this, the first instruction is further used to invoke the kernel to calculate a worst-case execution time of the batch system call based on the delay information in the AST data.

Correspondingly, the method provided in this embodiment further includes: The kernel calculates the worst-case execution time of the batch system call based on the delay information in the AST data.

Using the foregoing example as an example, there are 100 elements in the array. Therefore, a required element can be obtained by performing traversal at least 100 times. Therefore, the worst-case execution time may be calculated based on the quantity 100 of traversal times and a delay of each traversal.

Figure 4:
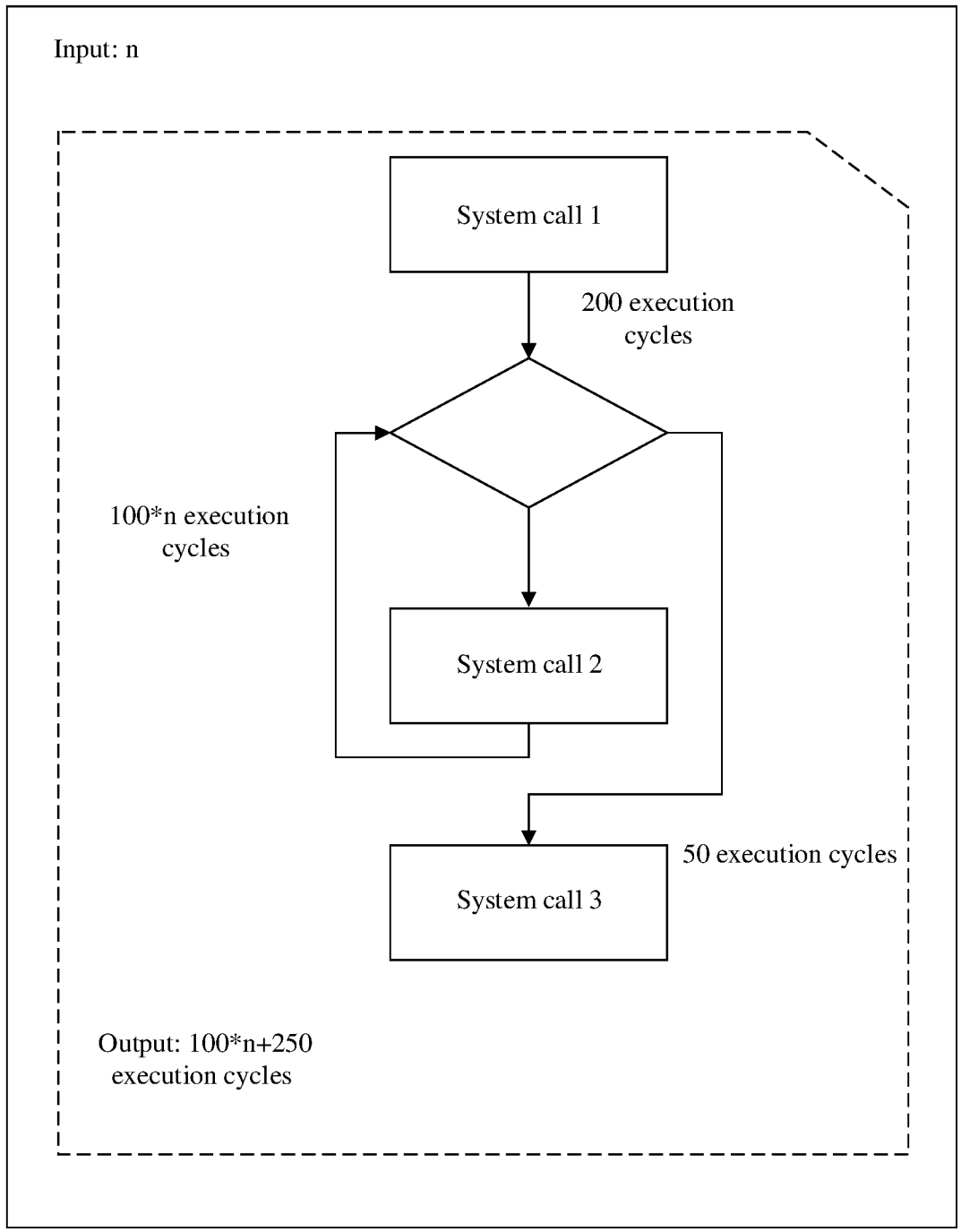
FIG. 4 is a schematic diagram of calculating a worst-case execution time according to an embodiment of this disclosure.

The AST data shown in FIG. 3 is used as an example. The batch system call includes a system call 1, a system call 2, and a system call 3. A schematic diagram of calculating a worst-case execution time may be shown in FIG. 4. The system call 1 needs to be executed only once, and a delay is 200 execution cycles of a central processing unit (CPU). The system call 3 also needs to be executed only once, and a delay is 50 execution cycles. The system call 2 needs to be executed a maximum of n times, and a delay of each execution is 100 execution cycles. In this case, the worst-case execution time is ($100 \times n + 250$) execution cycles, where n is a positive integer.

In this embodiment, the semantics for describing the delay information is added to the source code of the batch system call, and then the source code of the batch system call is compiled into the AST data that contains the delay information. After reading the AST data, the kernel may obtain the worst-case execution time of the batch system call through calculation based on the delay information in the AST data, so as to ensure that the batch system call has a deterministic delay.

In the foregoing embodiment, in a process of registering the batch system call, the kernel stores the binary code of the batch system call into the kernel-mode virtual address space. Similarly, after the worst-case execution time is obtained through calculation, the worst-case execution time may also be stored into the kernel-mode virtual address space. In an implementation, the first instruction is further used to invoke the kernel to store the worst-case execution time into the kernel-mode virtual address space. Correspondingly, the method provided in this embodiment further includes: The kernel stores the worst-case execution time into the kernel-mode virtual address space. The kernel can also store the worst-case execution time, similar to the binary code of the batch system call, into the batch system call table.

Figure 5:
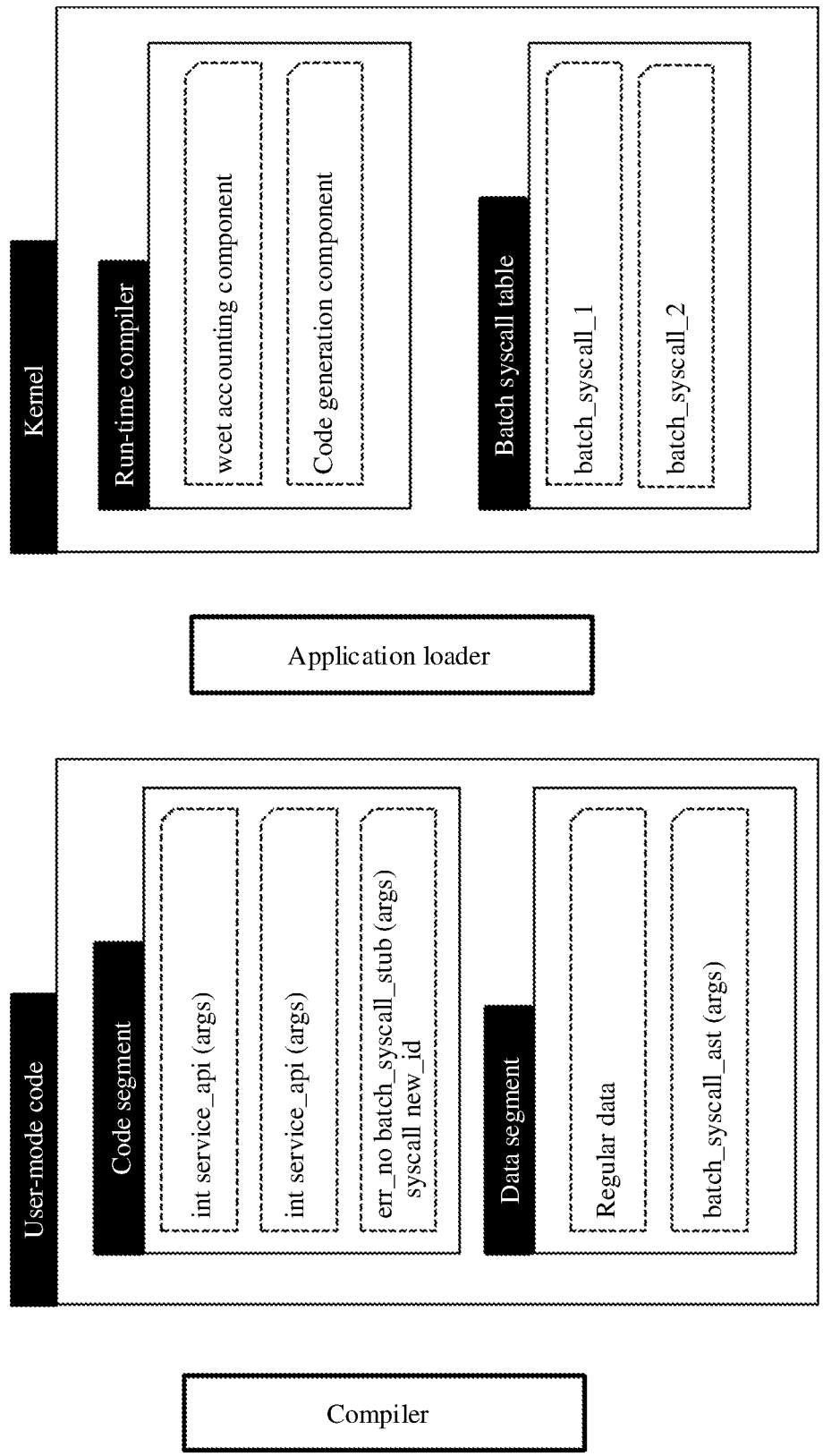
FIG. 5 is a schematic diagram of a software system architecture according to an embodiment of this disclosure.

Based on the descriptions of the foregoing embodiments, a software system architectural diagram of the method for implementing a batch system call provided in this embodiment may be shown in FIG. 5.

A software system framework may include a newly added compiler plug-in, user-mode code, an application loader after code modification, and a kernel.

The newly added compiler plug-in is configured to perform operation 101, that is, compile source code of the application into user-mode code (which may also be referred to as an executable program).

As shown in FIG. 5, the user-mode code includes a code segment and a data segment. The code segment includes call stub code err_no batch_syscall_stub (args) syscall new_id and binary code int service_api (args) that is of the application and that is used to invoke the batch system call. The data segment includes a regular data segment and AST data batch_syscall_ast (args).

The application loader is configured to perform operation 102 and operation 103.

The kernel includes a run-time compiler. The run-time compiler includes a worst-case execution time accounting component (wcet accounting component) and a code generation component. The worst-case execution time accounting component is configured to calculate the worst-case execution time based on the delay information in the AST data, and the code generation component is configured to perform operation 104, operation 105, and operation 106.

The kernel further includes a batch system call table (batch syscall table). The batch system call table shown in FIG. 5 specifically includes a batch system call 1 (batch_syscall_1) and a batch system call 2 (batch_syscall_2).

The foregoing describes the method provided in this embodiment from a perspective of a software system architecture, and the following further describes the method provided in this embodiment from different phases.

Figure 6:
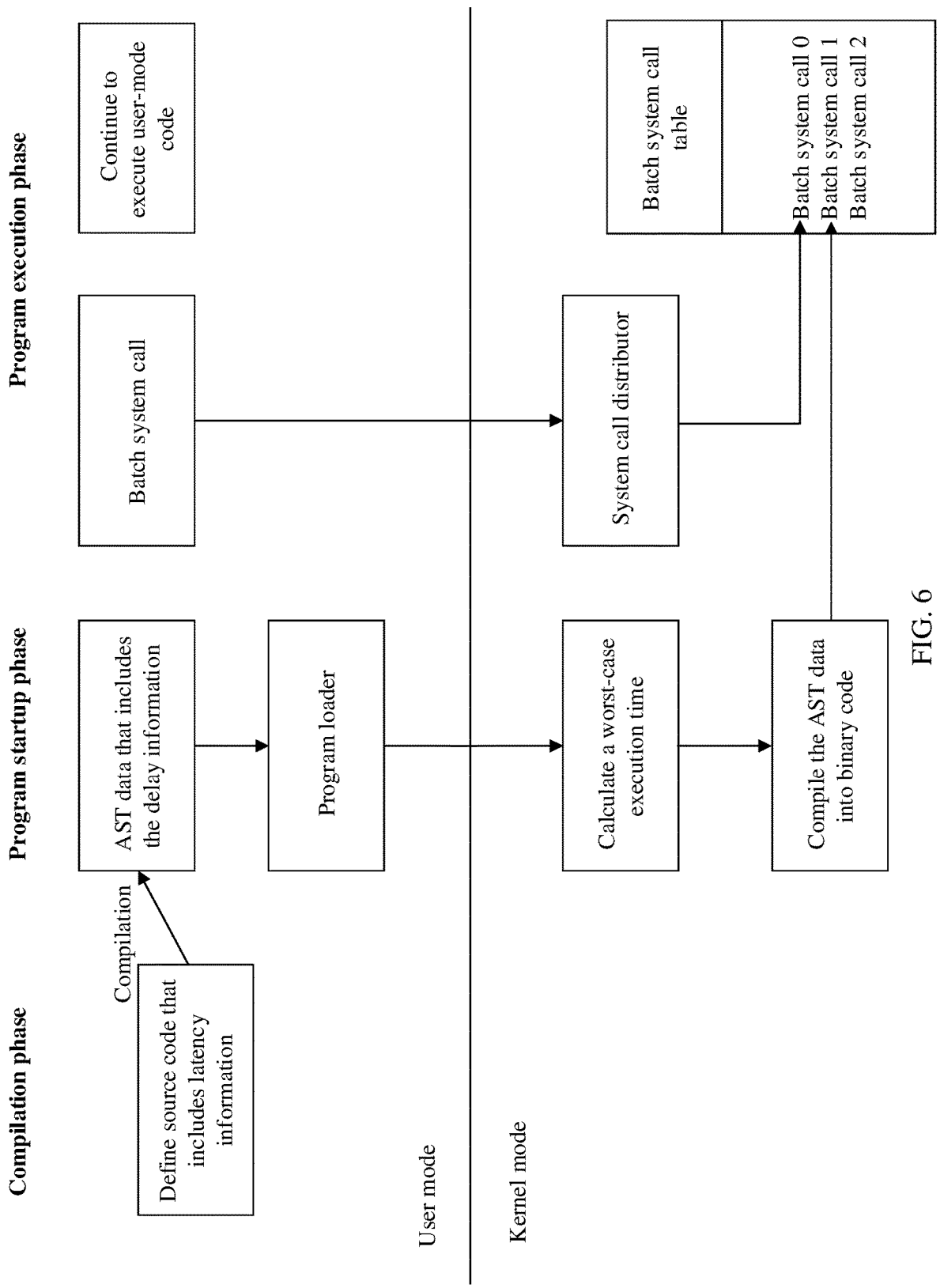
FIG. 6 is a schematic diagram of phases of a method for implementing a batch system call according to an embodiment of this disclosure.

As shown in FIG. 6, the method provided in this embodiment includes a compilation phase, a program startup phase, and a program execution phase.

In the compilation phase, source code of a script of an application is first defined, where the source code includes delay information. Then, operation 101 is performed to compile the source code into AST data, where the AST data includes the delay information.

The following describes the compilation process with a specific example.

Figure 7:
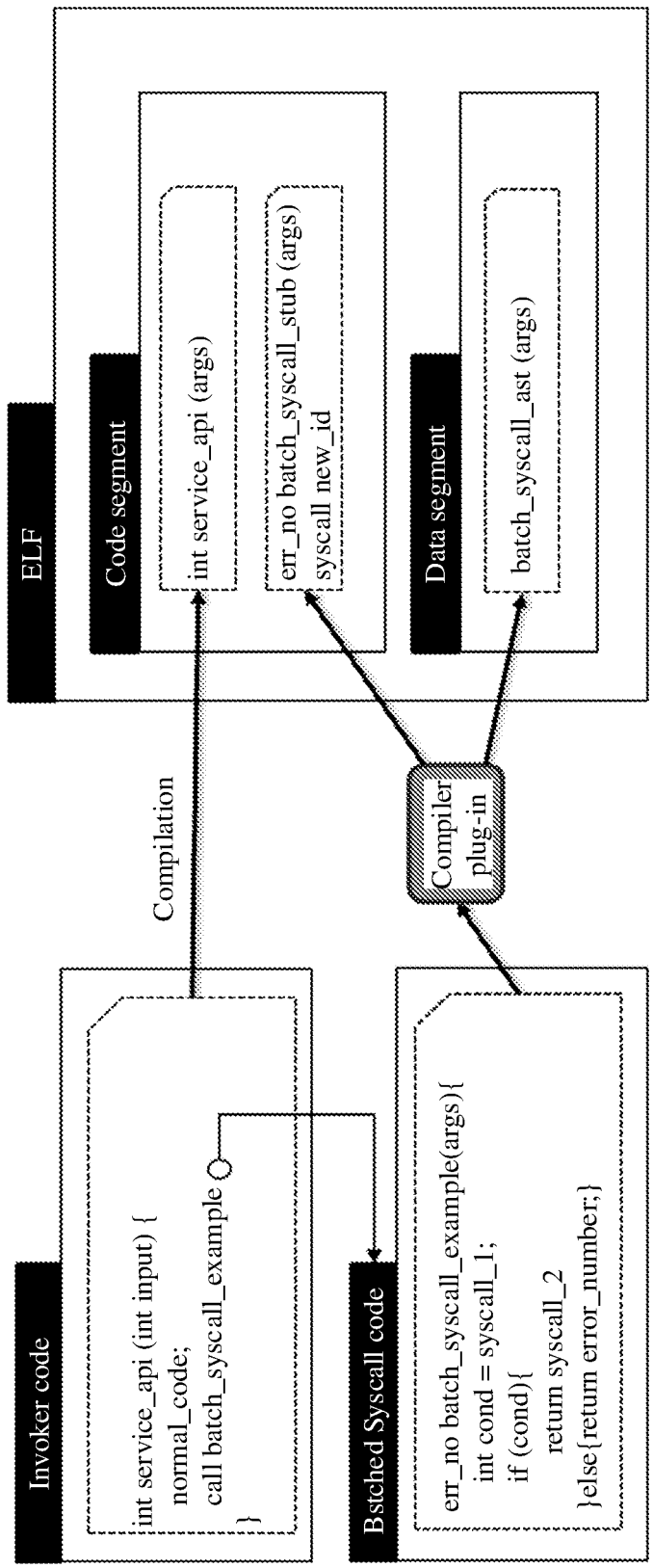
FIG. 7 is a schematic diagram of an embodiment of a compilation process according to an embodiment of this disclosure.

As shown in FIG. 7, the source code includes invoker code and batch system call (Batch Syscall) code. The invoker code may be compiled into binary code int service_api (args) by using a general compiler, and the Batch Syscall code may be compiled into call stub code err_no batch_syscall_stub (args) syscall new_id and AST data batch_syscall_ast (args) by using a newly added compiler plug-in. The binary code int service_api (args) and the call stub code err_no batch_syscall_stub (args) syscall new_id form a code segment in an executable and linkable format (ELF). The AST data batch_syscall_ast (args) belongs to a data segment in the executable and linkable format (ELF).

In the program startup phase, the AST data is first loaded by using a user-mode program loader (for example, the ELF loader). Then, the kernel is used to calculate the worst-case execution time and compile the AST data into the binary code. Finally, the binary code is registered into the batch system call table. As shown in FIG. 6, a system call table includes the batch system call 0, the batch system call 1, and the batch system call 2.

In the program execution phase, the user-mode code is executed. In a process of executing the user-mode code, the call stub code is executed, so as to initiate the batch system call. A kernel-mode system call distributor looks up the batch system call table for the batch system call based on the identifier of the binary code of the batch system call, and then the kernel executes the found batch system call. After the batch system call is performed, the user-mode code continues to be executed.

It should be noted that the code in the foregoing embodiment is merely an example of a specific representation of the solution provided in this disclosure, and cannot be used as a limitation on this disclosure. The solution provided in this disclosure may also be implemented through another programming language or another code form.

Figure 8:
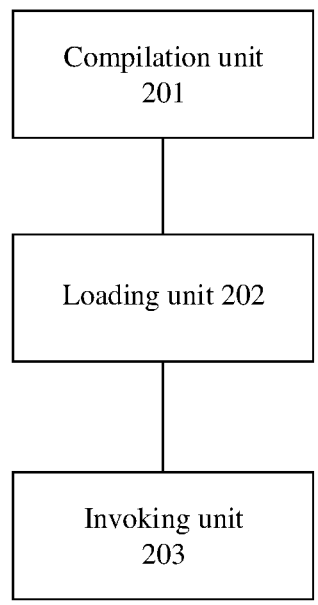
FIG. 8 is a schematic diagram of an embodiment of an apparatus for implementing a batch system call according to an embodiment of this disclosure.

As shown in FIG. 8, an embodiment of this disclosure further provides an embodiment of an apparatus for implementing a batch system call, including:
- a compilation unit 201, configured to compile source code of the batch system call into an executable program, where the executable program includes abstract syntax tree (AST) data of the batch system call;
- a loading unit 202, configured to load the executable program to a user-mode virtual address space, where the executable program is obtained by compiling the source code of the batch system call and includes the abstract syntax tree (AST) data of the batch system call; and
- an invoking unit 203, configured to invoke a first instruction, where the first instruction is used to invoke a kernel to read the AST data from the user-mode virtual address space, and generate, based on the AST data, binary code that is stored in a kernel-mode virtual address space and that is used to implement the batch system call.

In an implementation, the executable program further includes call stub code of the batch system call. Based on this, the invoking unit 203 is further configured to invoke a second instruction when the call stub code of the batch system call is executed, where the second instruction is used to invoke the kernel to execute the generated binary code.

In an implementation, the invoking unit 203 is further configured to receive an invoking result of the first instruction, where the invoking result includes an identifier of the binary code that is used to implement the batch system call. The second instruction carries the identifier, and is used to invoke the kernel to execute the binary code that corresponds to the identifier and that is used to implement the batch system call.

In an implementation, the source code of the batch system call includes delay information of the batch system call, and the AST data includes the delay information of the batch system call. The first instruction is further used to invoke the kernel to calculate a worst-case execution time of the batch system call based on the delay information in the AST data.

In an implementation, the first instruction is further used to invoke the kernel to store the worst-case execution time into the kernel-mode virtual address space.

For specific implementations, related descriptions, and technical effects of the foregoing units, refer to descriptions in the first aspect of embodiments of this disclosure.

Figure 9:
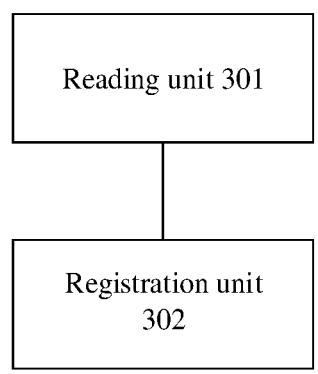
FIG. 9 is a schematic diagram of another embodiment of an apparatus for implementing a batch system call according to an embodiment of this disclosure.

As shown in FIG. 9, an embodiment of this disclosure further provides another embodiment of an apparatus for implementing a batch system call, including:
- a reading unit 301, configured to read, in response to a first instruction, abstract syntax tree (AST) data of the batch system call from a user-mode virtual address space; and
- a registration unit 302, configured to generate, based on the AST data, binary code that is used to implement the batch system call.

The registration unit 302 is further configured to store the binary code that is used to implement the batch system call in a kernel-mode virtual address space.

In an implementation, the registration unit 302 is further configured to execute, in response to a second instruction, the binary code that is used to implement the batch system call.

In an implementation, the second instruction carries an identifier of the binary code that is used to implement the batch system call. The registration unit 302 is further configured to execute, in response to the second instruction, the binary code that corresponds to the identifier and that is used to implement the batch system call.

In an implementation, the AST data includes delay information of the batch system call. The registration unit 302 is further configured to calculate a worst-case execution time of the batch system call based on the delay information in the AST data.

In an implementation, the registration unit 302 is further configured to store the worst-case execution time into the kernel-mode virtual address space.

For specific implementations, related descriptions, and technical effects of the foregoing units, refer to descriptions in the second aspect of embodiments of this disclosure.

Figure 10:
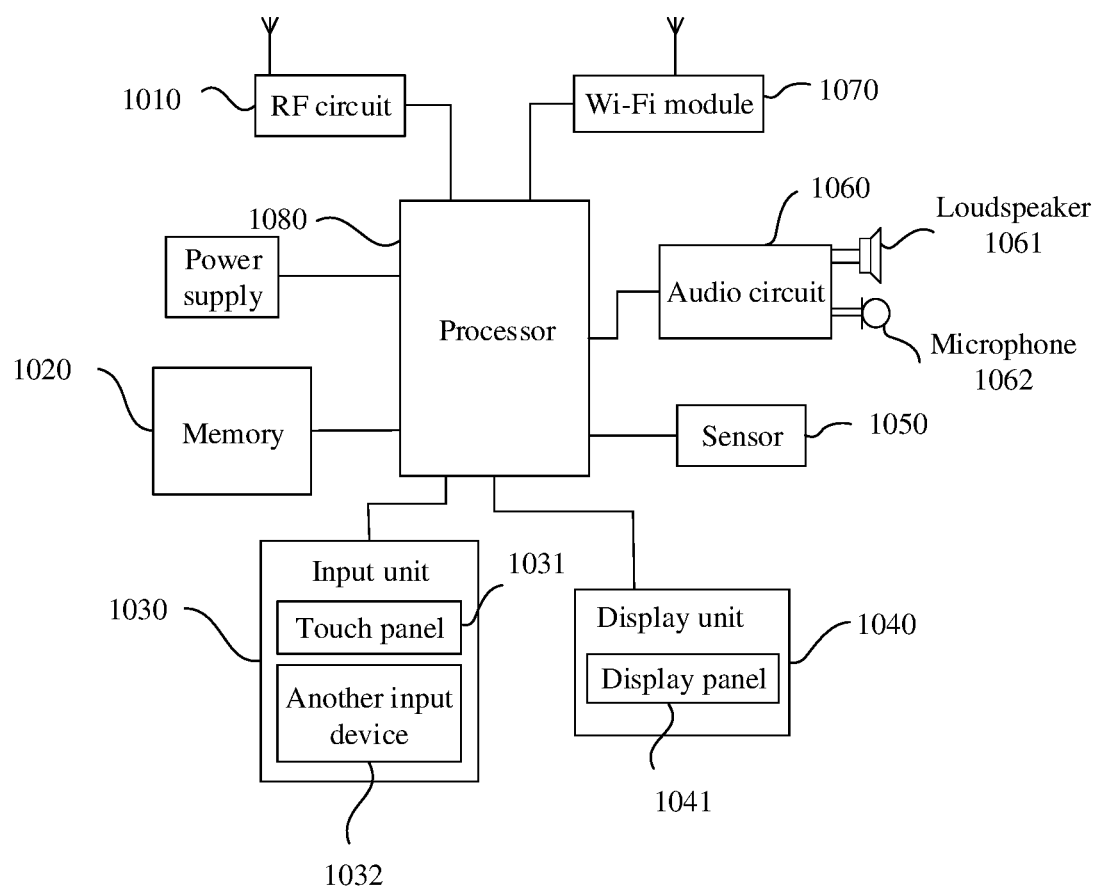
FIG. 10 is a schematic diagram of a structure of a terminal device according to an embodiment of this disclosure.

As shown in FIG. 10, an embodiment of this disclosure further provides another terminal device. For ease of description, only a part related to this embodiment is shown. For specific technical details that are not disclosed, refer to the method part in the embodiments of this disclosure. The terminal may be any terminal device, including: a mobile phone, a tablet computer, a personal digital assistant (PDA), a point of sales (POS), a vehicle-mounted computer, or the like, and for example, the terminal is a mobile phone.

FIG. 10 is a block diagram of a partial structure of a mobile phone related to a terminal according to an embodiment of this disclosure. As shown in FIG. 10, the mobile phone includes components such as a radio frequency (RF) circuit 1010, a memory 1020, an input unit 1030, a display unit 1040, a sensor 1050, an audio circuit 1060, a wireless fidelity (Wi-Fi) module 1070, a processor 1080, and a power supply. A person skilled in the art may understand that the structure of the mobile phone shown in FIG. 10 constitutes no limitation on the mobile phone. The mobile phone may include more or fewer components than those shown in the figure, may combine some components, or may have different component arrangements.

The following describes the components of the mobile phone in detail with reference to FIG. 10.

The RF circuit 1010 may be configured to receive and send signals during an information receiving and sending process or a call process. Particularly, the RF circuit 1010 receives downlink information from a base station, then delivers the downlink information to the processor 1080 for processing, and sends related uplink data to the base station. Generally, the RF circuit 1010 includes but is not limited to an antenna, at least one amplifier, a transceiver, a coupler, a low noise amplifier (LNA), a duplexer, and the like. In addition, the RF circuit 1010 may also communicate with a network and other devices through wireless communication. The wireless communication may use any communications standard or protocol, including but not limited to Global System for Mobile Communications (GSM), general packet radio service (GPRS), Code Division Multiple Access (CDMA), Wideband Code Division Multiple Access (WCDMA), Long Term Evolution (LTE), an email, a short message service (SMS), and the like.

The memory 1020 may be configured to store a software program and a module. The processor 1080 executes various function applications of the mobile phone and data processing by running the software program and the module that are stored in the memory 1020. The memory 1020 may mainly include a program storage area and a data storage area. The program storage area may store an operating system, an application required for at least one function (such as a sound play function and an image play function), and the like. The data storage area may store data (such as audio data and a phone book) created based on use of a mobile phone, and the like. In addition, the memory 1020 may include a high-speed random access memory, or may include a non-volatile memory, for example, at least one magnetic disk storage device, a flash memory device, or other volatile solid-state storage devices.

The input unit 1030 may be configured to receive input digit or character information, and generate a key signal input related to user setting and function control of the mobile phone. Specifically, the input unit 1030 may include a touch panel 1031 and another input device 1032. The touch panel 1031, also referred to as a touchscreen, may collect a touch operation performed by a user on or near the touch panel 1031 (for example, an operation performed by the user on the touch panel 1031 or near the touch panel 1031 by using any appropriate object or accessory such as a finger or a stylus) and drive a corresponding connection apparatus based on a preset program. Optionally, the touch panel 1031 may include two parts: a touch detection apparatus and a touch controller. The touch detection apparatus detects a touch direction and position of the user, detects a signal generated by a touch operation, and transmits the signal to the touch controller. The touch controller receives touch information from the touch detection apparatus, converts the touch information into point coordinates, and sends the point coordinates to the processor 1080; and can receive and execute a command sent by the processor 1080. In addition, the touch panel 1031 may be implemented in a plurality of forms, for example, as a resistive, capacitive, infrared, or surface acoustic wave touch panel. The input unit 1030 may further include the another input device 1032 in addition to the touch panel 1031. Specifically, the another input device 1032 may include but is not limited to one or more of a physical keyboard, a function button (such as a volume control button or an on/off button), a trackball, a mouse, a joystick, and the like.

The display unit 1040 may be configured to display information input by the user, information provided for the user, and various menus of the mobile phone. The display unit 1040 may include a display panel 1041. Optionally, the display panel 1041 may be configured in a form of a liquid crystal display (LCD), an organic light-emitting diode (OLED), or the like. Further, the touch panel 1031 can cover display panel 1041. After detecting a touch operation on or near the touch panel 1031, the touch panel 1031 transmits the touch operation to the CPU 1080 to determine a type of a touch event. Then, the processor 1080 provides corresponding visual output on the display panel 1041 based on the type of the touch event. In FIG. 10, the touch panel 1031 and the display panel 1041 are used as two independent components to implement input and output
functions of the mobile phone. However, in some embodiments, the touch panel 1031 and the display panel 1041 may be integrated to implement the input and output functions of the mobile phone.

The mobile phone may further include at least one sensor 1050, for example, an optical sensor, a motion sensor, and other sensors. Specifically, the optical sensor may include an ambient light sensor and a proximity sensor. The ambient light sensor may adjust luminance of the display panel 1041 based on brightness of ambient light. The proximity sensor may turn off the display panel 1041 and/or backlight when the mobile phone moves close to an ear. As a type of motion sensor, an accelerometer sensor can detect magnitudes of accelerations in all directions (usually three axes), can detect a magnitude and a direction of gravity when the mobile phone is in a static state, and can be applied to an application recognizing a mobile phone posture (such as screen switching between a portrait mode and a landscape mode, a related game, and magnetometer posture calibration), a function related to vibration recognition (such as a pedometer or tapping), and the like. For another sensor that may also be configured in the mobile phone, such as a gyroscope, a barometer, a hygrometer, a thermometer, or an infrared sensor, details are not described herein.

The audio circuit 1060, a loudspeaker 1061, and a microphone 1062 may provide an audio interface between the user and the mobile phone. The audio circuit 1060 may transmit, to the loudspeaker 1061, an electrical signal that is obtained through conversion of received audio data, and the loudspeaker 1061 converts the electrical signal into a sound signal and outputs the sound signal. In addition, the microphone 1062 converts a collected sound signal into an electrical signal; the audio circuit 1060 receives the electrical signal and converts the electrical signal into audio data, and outputs the audio data to the processor 1080 for processing; and processed audio data is sent to, for example, another mobile phone through the RF circuit 1010, or the audio data is output to the memory 1020 for further processing.

Wi-Fi is a short-range wireless transmission technology. By using the Wi-Fi module 1070, the mobile phone can help the user, for example, send/receive an email, browse a web page, and access streaming media. The Wi-Fi module 1070 provides wireless broadband Internet access for the user. Although FIG. 10 shows the Wi-Fi module 1070, it can be understood that the Wi-Fi module 1070 is not a mandatory constituent of the mobile phone and may be totally omitted as required without changing the essence scope of the present disclosure.

The processor 1080 is a control center of the mobile phone, and connects to all parts of the entire mobile phone by using various interfaces and lines. The processor 1080 executes various functions of the mobile phone and processes data by running or executing the software program and/or the module stored in the memory 1020 and by calling data stored in the memory 1020, so as to perform overall monitoring on the mobile phone. Optionally, the CPU 1080 may include one or more processing units. Preferably, the processor 1080 may integrate an application processor and a modem processor. The application processor mainly processes an operating system, a user interface, an application program, and the like. The modem processor mainly processes wireless communication. It may be understood that the modem processor may alternatively not be integrated into the CPU 1080.

The mobile phone further includes the power supply (for example, a battery) that supplies power to the components. Preferably, the power supply may be logically connected to the processor 1080 by using a power management system, so that functions such as charging and discharging management and power consumption management are implemented by using the power management system.

Although not shown, the mobile phone may further include a camera, a Bluetooth module, and the like. Details are not described herein.

In this embodiment, the processor 1080 included in the terminal may run the user-mode process and the kernel in the foregoing embodiments.

The user-mode process is configured to perform a user-mode operation in FIG. 2, and the kernel is configured to perform an operation performed by the kernel in FIG. 2.

An embodiment of this disclosure further provides a chip, including one or more processors. A part or all of the processors are configured to read and execute computer programs stored in a memory, to perform the method in the embodiment according to FIG. 2.

Optionally, the chip includes the memory, and the memory and the processor are connected to the memory by using a circuit or a wire. Further, optionally, the chip further includes a communication interface, and the processor is connected to the communication interface. The communication interface is configured to receive data or information or both that need to be processed. The processor obtains the data and/or the information from the communication interface, processes the data and/or the information, and outputs a processing result through the communication interface. The communication interface may be an input/output interface.

In some implementations, some of the one or more processors may implement some steps in the foregoing method by using dedicated hardware. For example, processing related to a neural network model may be implemented by a dedicated neural network processor or graphics processing unit.

The method provided in embodiments of this disclosure may be implemented by one chip, or may be cooperatively implemented by a plurality of chips.

An embodiment of this disclosure further provides a computer storage medium. The computer storage medium is configured to store computer software instructions used by the foregoing computer device, and the computer software instructions include a program designed for execution by the computer device.

The computer device may include the apparatuses for implementing a batch system call described in FIG. 8 and FIG. 9.

An embodiment of this disclosure further provides a computer program product. The computer program product includes computer software instructions, and the computer software instructions may be loaded by using a processor to implement the procedure in the method shown in FIG. 2.

It should be noted that, for ease of application and understanding, some systems, modules, devices, elements, data structures, instructions, and the like that are mentioned are named in the embodiments of this disclosure. Uppercase and lowercase of these names have same meanings unless otherwise specified. In addition, these names may be changed as required, and should not constitute any limitation on the solution provided in this disclosure.

It should be noted that, the solution provided in this embodiment may be applied to a terminal device, a server, or the like. The terminal device herein includes but is not limited to a smartphone, a vehicle-mounted apparatus (for example, a self-driving device), a personal computer, an artificial intelligence device, a tablet computer, a personal digital assistant, an intelligent wearable device (for example, a smart watch or band, or smart glasses), an intelligent voice device (for example, a smart speaker), a virtual reality/mixed reality/enhanced display device or a network access device (for example, a gateway), or the like. The server may include a storage server, a computing server, or the like.

It should be noted that division into modules or units provided in the foregoing embodiments is merely an example, functions of the described modules are merely used as examples for description, and this disclosure is not limited thereto. A person of ordinary skill in the art can converge functions of two or more modules thereof as required, or divide a function of one module to obtain more modules at a finer granularity and other variants.

Same or similar parts between the embodiments described above may be cross-referenced. "A plurality of" in this disclosure means two or more or "at least two" unless otherwise specified. "A/B" in this disclosure includes any of three cases: "A", "B", and "A and B". In this disclosure, an "identifier (id)" of an object refers to information that uniquely identifies the object. The "identifier" may directly identify the object, for example, a name of the object, or may indirectly indicate the object, for example, a storage address of the object. In this disclosure, "first", "second", "third", and the like are merely used for distinguishing expressions, and are not intended to limit a sequence. In addition, a first object and a second object may be combined or refer to a same object in some cases. Further, because there is no limited sequence, there may be no first, and there may be second or third.

The described apparatus embodiments are merely examples. The modules described as separate parts may or may not be physically separate, and parts displayed as modules may or may not be physical modules, may be located in one position, or may be distributed on a plurality of network modules. Some or all the modules may be selected according to actual needs to achieve the objectives of the solutions of the embodiments. In addition, in the accompanying drawings of the apparatus embodiments provided by this disclosure, connection relationships between modules indicate that the modules have communication connections with each other, which may be specifically implemented as one or more communications buses or signal cables. A person of ordinary skill in the art may understand and implement embodiments of the present disclosure without creative efforts.

The foregoing descriptions are merely some specific embodiments of this disclosure, but the protection scope of this disclosure is not limited thereto.

What is claimed is:

1. A method for implementing a batch system call, comprising:

loading an executable program to a user-mode virtual address space, wherein the executable program is obtained by compiling source code of the batch system call, and the executable program comprises abstract syntax tree (AST) data of the batch system call; and invoking a first instruction, wherein the first instruction, when executed, causes a kernel to read the AST data from the user-mode virtual address space, and generate, based on the AST data, binary code for implementing the batch system call, the binary code being stored in a kernel-mode virtual address space.

2. The method according to claim 1, wherein the executable program further comprises call stub code of the batch system call, and the method further comprises:

invoking a second instruction when the call stub code of the batch system call is executed, wherein the second instruction, when executed, causes the kernel to execute the binary code to implement the batch system call.

3. The method according to claim 2, wherein after the invoking of the first instruction, the method further comprises:

receiving an invoking result of the first instruction, wherein the invoking result comprises an identifier of the binary code for implementing the batch system call, wherein the second instruction carries the identifier, and the second instruction, when executed, causes the kernel to execute the binary code corresponding to the identifier to implement the batch system call.

4. The method according to claim 1, wherein the source code of the batch system call comprises delay information of the batch system call, and the AST data comprises the delay information of the batch system call; and the first instruction, when executed, further causes the kernel to calculate a worst-case execution time of the batch system call based on the delay information in the AST data.

5. The method according to claim 4, wherein the first instruction, when executed, further causes the kernel to store the worst-case execution time into the kernel-mode virtual address space.

6. An apparatus for implementing a batch system call, comprising at least one memory and at least one processor, wherein the at least one memory is configured to store a computer program, and the at least one processor is configured to invoke the computer program from the at least one memory and run the computer program to perform operations comprising:

loading an executable program to a user-mode virtual address space, wherein the executable program is obtained by compiling source code of the batch system call, and the executable program comprises abstract syntax tree (AST) data of the batch system call; and invoking a first instruction, wherein the first instruction, when executed, causes a kernel to read the AST data from the user-mode virtual address space, and generate, based on the AST data, binary code for implementing the batch system call, the binary code being stored in a kernel-mode virtual address space.

7. The apparatus according to claim 6, wherein the executable program further comprises call stub code of the batch system call, and the operations further comprise:

invoking a second instruction when the call stub code of the batch system call is executed, wherein the second instruction, when executed, cause the kernel to execute the binary code to implement the batch system call.

8. The apparatus according to claim 7, wherein after the invoking of the first instruction, the operations further comprise:

receiving an invoking result of the first instruction, wherein the invoking result comprises an identifier of the binary code for implementing the batch system call, wherein the second instruction carries the identifier, and the second instruction, when executed, causes the kernel to execute the binary code corresponding the identifier to implement the batch system call.

9. The apparatus according to claim 6, wherein the source code of the batch system call comprises delay information of the batch system call, and the AST data comprises the delay information of the batch system call; and the first instruction, when executed, further causes the kernel to calculate a worst-case execution time of the batch system call based on the delay information in the AST data.

10. The apparatus according to claim 9, wherein the first instruction, when executed, further causes the kernel to store the worst-case execution time into the kernel-mode virtual address space.

11. A non-transitory storage medium, storing a computer program that, when executed by one or more processors, control the one or more processors to perform operations comprising:

loading an executable program to a user-mode virtual address space, wherein the executable program is obtained by compiling source code of a batch system call, and the executable program comprises abstract syntax tree (AST) data of the batch system call; and invoking a first instruction, wherein the first instruction, when executed, causing a kernel to read the AST data from the user-mode virtual address space, and generate, based on the AST data, binary code for implementing the batch system call, the binary code being stored in a kernel-mode virtual address space.

12. The non-transitory storage medium according to claim 11, wherein the executable program further comprises call stub code of the batch system call, and the operations further comprise:

invoking a second instruction when the call stub code of the batch system call is executed, wherein the second instruction, when executed, causes the kernel to execute the binary code to implement the batch system call.

13. The non-transitory storage medium according to claim 12, wherein after the invoking of the first instruction, the operations further comprise:

receiving an invoking result of the first instruction, wherein the invoking result comprises an identifier of the binary code for implementing the batch system call, wherein the second instruction carries the identifier, and the second instructions, when executed, causes the kernel to execute the binary code corresponding to the identifier to implement the batch system call.

14. The non-transitory, computer-readable storage medium according to claim 11, wherein the source code of the batch system call comprises delay information of the batch system call, and the AST data comprises the delay information of the batch system call; and the first instruction, when executed, further causes the kernel to calculate a worst-case execution time of the batch system call based on the delay information in the AST data.

15. The non-transitory, storage medium according to claim 14, wherein the first instruction, when executed, further causes the kernel to store the worst-case execution time into the kernel-mode virtual address space.

16. The method of claim 1, wherein the AST data represents a syntax structure of a programming language in a tree, and each node in the tree represents a structure in the source code of the batch system call.

17. The method of claim 1, wherein the AST data of the batch system call belongs to a data segment in the executable program of the batch system call.

* * * * *

UNITED STATES PATENT AND TRADEMARK OFFICE
CERTIFICATE OF CORRECTION

| | | |
|---|---|---|
| PATENT NO. | : 12,367,019 B2 | Page 1 of 1 |
| APPLICATION NO. | : 18/365312 | |
| DATED | : July 22, 2025 | |
| INVENTOR(S) | : Xin Gao | |

It is certified that error appears in the above-identified patent and that said Letters Patent is hereby corrected as shown below:

In the Claims

Column 21, Claim 7, Line 63, change "cause" to -- causes --; and

Column 22, Claim 11, Line 43, change "causes" to -- causing --.

Signed and Sealed this
Twenty-sixth Day of August, 2025

Coke Morgan Stewart
*Acting Director of the United States Patent and Trademark Office*